Feb. 14, 1928.

H. C. MALLORY 1,659,038

EXPANSIBLE COLLAPSIBLE ELEMENT

Filed July 25, 1925

Patented Feb. 14, 1928.

1,659,038

UNITED STATES PATENT OFFICE.

HARRY C. MALLORY, DECEASED, LATE OF BELLPORT, NEW YORK, BY SUE R. MALLORY, ADMINISTRATRIX, OF BELLPORT, NEW YORK.

EXPANSIBLE COLLAPSIBLE ELEMENT.

Original application filed August 31, 1920, Serial No. 407,206, now Patent No. 1,617,857. Divided and this application filed July 25, 1925. Serial No. 46,102.

The invention relates to elastic elements, and the same has for its object more particularly to provide an elastic metallic element for use in connection with apparatus or devices subject to or influenced by temperature or pressure variations, whereby they operate a valve, apparatus or other mechanism.

Further, said invention has for its object to provide an expansible-collapsible element for purposes such as above indicated, which is so reinforced as to facilitate the attaching or securing of other parts or devices thereto.

Further, said invention has for its object to provide an expansible-collapsible element of the character specified having one end interiorly reinforced whereby to give greater strength and rigidity to said end, and to facilitate the attaching or securing of other parts or devices thereto.

Further, said invention has for its object to provide a cylindrical, corrugated expansible-collapsible element having an open end, and a closed end, and a rigid disk permanently secured within said element at its closed end whereby to interiorly reinforce said end, and which also may serve as a valve face, and to facilitate the attaching or securing of other parts or devices thereto.

Other objects will in part be obvious, and in part be pointed out hereinafter.

To the attainment of the aforesaid objects and ends the invention consists in the novel details of construction, and in the combination, connection and arrangement of parts, hereinafter more fully described and then pointed out in the claims.

In the accompanying drawings forming part of this specification, wherein like numerals of reference indicate like parts,—

Figure 1:
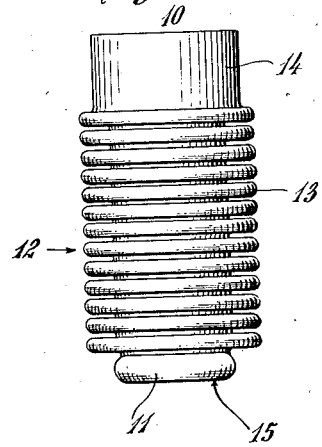
Figure 1 is an elevation showing one form of expansible-collapsible element constructed according to and embodying the said invention.
Figure 2:
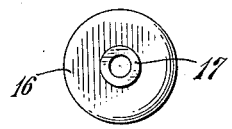
Fig. 2 is a face view illustrating one form of reinforcing member.
Figure 3:
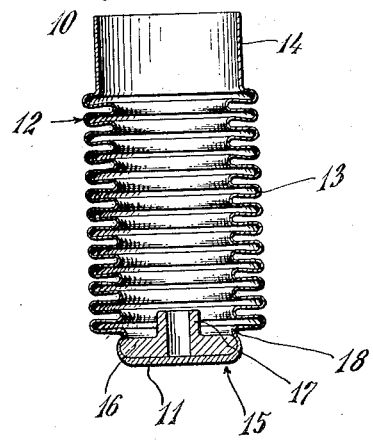
Fig. 3 is a central vertical sectional view of the element.

The elastic expansible-collapsible element 10, formed from a cylindrical metal blank, has a thin, flexible wall of drawn metal and an imperforate, closed end 11 preferably of greater thickness than the body portion 12 of the element 10 with which the same is integral. A series of parallel corrugations or folds 13 are formed in said body portion 12. The opposite open end 14 of the element 10 is tubular or annular and is adapted to be attached to a suitable support.

A boss 15 of smaller diameter than the body portion 12 of the element 10 extends outwardly therefrom at the closed end 11 thereof. Disposed within the boss 15 is a metal reinforcing member 16 of the desired shape but of slightly smaller outline or contour than the interior diameter of the boss 15. The member 16 is herein shown in the form of a circular disk having its edge rounded and provided upon its upper surface with a centrally disposed boss or stem 17 for associating the element with parts or devices which are to be controlled by said element.

The reinforcing member 16 is secured within the boss 15 by rolling or crimping the portion of the shell 10 adjacent or contiguous to said member 16 over and around the rounded edge thereof forming an annular groove or constricted portion 18 in said shell 10 at the junction of the body portion 12 thereof with the side wall of the boss 15. The annular groove 18 should be of such depth that its inner edge extends sufficiently inwardly over the edge of the disk 16 to engage and firmly hold said disk 16 rigidly in position within the boss 15.

The corrugations 13 are preferably formed after the disk 16 is positioned and secured within the boss 15. To form the corrugations 13 the shell 10 is secured in a suitable revoluble support by clamping or otherwise fastening the reinforced boss 15 within a chuck or clamp, and then the thinner or body portion 12 of the shell is subjected to the action of suitable dies which circumferentially corrugate the same. A convenient method of corrugating the shell is shown in the patent of Harry C. Mallory, granted August 24, 1926, No. 1,597,206.

This application is a division of an application, Serial No. 407,206, filed by Harry C. Mallory August 31, 1920, patented February 15, 1927, No. 1,617,857, the latter application being a continuation in part or in part a division of an application, Serial No. 835,593, filed by him April 22, 1914, renewed December 5, 1919, Serial No. 342,802, and patented January 25, 1921, No. 1,366.473.

In this case no claim is made for the process from which the product herein shown, described and claimed results, as said process constitutes the subject matter of said application, Serial No. 407,206.

Having thus described the invention, what is claimed and desired to be secured by Letters Patent is:

1. An expansible-collapsible element comprising a shell having a circumferentially corrugated body portion, a closed end integral with said body portion, a separate reinforcing member disposed within said closed end and conforming substantially in outline thereto, and a portion of said shell extending over said member into engagement therewith and securing said reinforcing member in place within said closed end, substantially as specified.

2. An expansible-collapsible element comprising a shell having a circumferentially corrugated body portion, a closed end integral with said body portion, a flat, circular member disposed within said closed end, and an annular constricted portion between said body portion and said closed end for securing said flat, circular member in place within said closed end, substantially as specified.

3. An expansible-collapsible element comprising a cylindrical shell having a circumferentially corrugated body portion, a closed end integral with said body portion providing a boss of smaller diameter than said body portion extending outwardly therefrom, a flat, circular disk disposed within said boss, and an annular groove in said shell at the junction of said body portion with said boss serving to secure said disk in place within said boss, substantially as specified.

4. An expansible-collapsible element comprising a metal shell having a thin, flexible body portion circumferentially corrugated to render the same elastic, a closed, imperforate end integral with said body portion providing a boss of smaller diameter than said body portion extending outwardly therefrom, a reinforcing member secured within said boss and conforming substantially in outline thereto, a portion of said shell extending over said member into engagement therewith to retain the same in position, and means at said reinforced closed end to permit association of said element with parts controlled thereby, substantially as specified.

5. An expansible-collapsible element comprising a metal shell having a thin, flexible body portion circumferentially corrugated to render the same elastic, a closed, imperforate end integral with said body portion, a reinforcing member disposed within said closed end and conforming substantially in outline thereto, an annular groove in said shell at the junction of said body portion and said closed end serving to secure said member in place, and means at said reinforced closed end to permit association of said element with parts controlled thereby, substantially as specified.

6. An expansible-collapsible element comprising a metal shell having a thin, flexible body portion circumferentially corrugated to render the same elastic, a closed, imperforate end integral with and of greater thickness than said body portion, a reinforcing member disposed within said closed end, and a portion in said shell intermediate said thin and thicker portions thereof for securing said member in place, substantially as specified.

7. An expansible-collapsible element comprising a metal shell having a thin, flexible body portion circumferentially corrugated to render the same elastic, a closed, imperforate end integral with and of greater thickness than said body portion, a reinforcing member disposed within said closed end, and a portion in said shell intermediate said thin and thicker portions thereof for securing said member in place, and means on said member to permit of the attachment of said element to parts controlled thereby, substantially as specified.

8. An expansible-collapsible element comprising a shell having a thin, flexible body portion of drawn metal circumferentially corrugated to render the same elastic, a closed, imperforate end integral with and of greater thickness than said body portion providing a boss extending outwardly from said body portion, a reinforcing member disposed within said boss and conforming in outline thereto, and an annular, constricted portion at the junction of said body portion with said boss serving to secure said member in place within said boss, substantially as specified.

Signed at the city of New York, in the county and State of New York, this 22nd day of July, one thousand nine hundred and twenty-five.

SUE R. MALLORY,
*Admx. Est. Harry C. Mallory, Decd.*

CERTIFICATE OF CORRECTION.

Patent No. 1,659,038.            Granted February 14, 1928, to

SUE R. MALLORY, Administratrix of HARRY C. MALLORY, deceased.

It is hereby certified that the above numbered patent was erroneously issued to "Sue R. Mallory, Administratrix, of Hary C. Mallory, deceased", whereas said Letters Patent should have been issued to "American Radiator Company, of Chicago, Illinois", a Corporation of New Jersey, said Corporation being assignee by mesne assignments of the entire interest in said invention, as shown by the records of assignments in this office; and that the said Letters Patent should be read with this correction therein that the same may conform to the record of the case in the Patent Office.

Signed and sealed this 27th day of March, A. D. 1928.

Seal.                                      M. J. Moore,
                                         Acting Commissioner of Patents.